United States Patent

[11] 3,542,178

| | | |
|---|---|---|
| [72] | Inventor | Melvin H. Ripple<br>North Canton, Ohio |
| [21] | Appl. No. | 810,247 |
| [22] | Filed | March 25, 1969 |
| [45] | Patented | Nov. 24, 1970 |
| [73] | Assignee | The Hoover Company<br>North Canton, Ohio<br>a corporation of Delaware |

[54] FLEXIBLE COUPLING FOR SEPARABLE SHAFTS
13 Claims, 11 Drawing Figs.

[52] U.S. Cl. .................................................. 192/108;
            64/27; 192/55; 259/108; 117/139
[51] Int. Cl. ............................................. F16d 11/00
[50] Field of Search ......................................... 192/108,
           67, 55; 64/11, 14, 27; 117/139; 146/68

[56] References Cited
UNITED STATES PATENTS

| | | | | |
|---|---|---|---|---|
| 2,755,900 | 7/1956 | Seyfried ..................... | | 192/108X |
| 2,794,627 | 6/1957 | Rodwick ..................... | | 192/67X |
| 3,001,221 | 9/1961 | Wojciechowski ............ | | 117/139X |
| 3,064,949 | 11/1962 | Dewenter ..................... | | 64/14X |

Primary Examiner—Benjamin W. Wyche
Attorneys—Alfred G. Gross and Alan G. Paul

ABSTRACT: A separable coupling particularly adapted for household blenders including a pair of coupling members having engageable teeth with non-radial working or driving surfaces which are specially shaped to improve self-indexing and self-alignment. One of the pair of coupling members is of soft rubber and has its surface halogenated to reduce friction and improve self-indexing with respect to the other of the pair of coupling members which is of a rigid material, preferably a polyacetal plastic.

Patented Nov. 24, 1970

3,542,178

Patented Nov. 24, 1970 3,542,178

3,542,178

FLEXIBLE COUPLING FOR SEPARABLE SHAFTS

BACKGROUND OF THE INVENTION

1. Field of the Invention

This invention relates to separable flexible rotatable couplings which are adapted to self-aline and self-index upon blind engagement; more particularly the invention relates to an axially engageable coupling especially well suited for use on household blenders which have separable power units and containers.

2. Description of the Prior Art

Household blenders generally comprise a container and a separable base. The container has a cutter blade mounting shaft rotatably journalled through the bottom thereof. A pair of complementary coupling members, on the cutter blade mounting shaft, outside of the container and on a drive shaft extending from the power unit, are readily axially engageable, for driving cutter blades within the container, and disengageable so that the container can be separated from the power unit to pour food stuffs therefrom. In this type of appliance it is highly desirable to have a coupling which will easily self-index and become engaged by merely placing the container on the power unit. The cutter blade mounting shaft and the power unit drive shaft are often misaligned radially, due to the necessary tolerances between the diameter of the container and the locating elements on the power unit. Further, the blind engagement of the cooperating coupling members means that, more times than not, the coupling members are also angularly misaligned. It is desirable that the coupling members be alined so that they will index and drive properly under such conditions. In order to achieve this, it is necessary to have the coacting elements within the coupling members which will act to coaxially aline the complementary coupling members as they are engaged. To be fail-safe, it is also necessary that the mating surfaces of the coacting elements of the coupling members will slide easily relative to one another while being flexible enough to absorb impact or shock loads that can occur when the coupling members are engaged while the power unit is on.

Many prior art couplings for blenders have been made of metal, as smooth metal surfaces slide past one another quite readily. However, metal coupling members do not satisfactorily withstand the impact loads occuring when the container is jammed on a power unit which is already turned on. Also, unlubricated metal driving surfaces are noisy when operating at the high speeds achieved in modern blenders. Some prior devices have attempted to overcome the objectionable noise and fragility of rigid materials, such as metals, by using elastomeric materials. The elastomeric materials, such as rubber, must be relatively soft or they will also be fragile and noisy. However, prior flexible couplings being made of soft rubber, often did not index well since soft rubber has a rather high coefficient of surface friction and does not slide easily. Furthermore, with relatively soft rubber, the teeth of a coupling member must be specially shaped so that the teeth will drive under load without excessive deformation which might cause the coupling to slip.

SUMMARY OF THE INVENTION

The invention relates to a rotatable coupling, particularly adapted for household blenders and comprising first and second axially engageable coupling members.

It is an objective of the present invention to construct a coupling that will mate blindly providing good initial engagement and self-alinement. More specifically, it is an object of the invention to construct a relatively soft flexible coupling which has a low coefficient of surface friction and to provide the coupling member with a shape which provides easy surface indexing and good positive drive with a mating coupling member.

It is a further object of this invention to provide a rigid complementary coupling member adapted to mate with the flexible coupling member so that easy indexing and positive drive are readily obtainable.

The objectives are achieved by providing complementary coupling members with teeth that are shaped so that there is little likelihood of interference when they are blindly mated and by halogenating of the working surfaces of the relatively soft rubber teeth of the flexible coupling so that the rubber surfaces are glazed and have a low coefficient of friction while the interior of each tooth is still soft and flexible enough to withstand impact without breaking and to act as a sound-deadening device.

The first is of the pair of coacting and complementary coupling members is formed of elastomeric material, the surface of which is halogenated, and has a generally cylindrical body portion with a plurality of equally spaced teeth projecting outwardly therefrom. Each of the teeth is defined by first, second and third planar faces designed to function as forward, trailing and indexing surfaces, respectively. The first planar face, or working surface, of each of the teeth extends substantially parallel and nonradially with respect to the longitudinal axis of the body portion. The first and second faces of each of the teeth intersect at an acute angle, and an imaginary radial plane passing through the apex of the tooth would bisect the included angle. The third face, or indexing surface, cuts off a portion of the trailing surface and intersects the outer end of the tooth in a line which is radial with respect to the longitudinal axis of the first coupling member. Furthermore, the third face passes through the intersection of the apex of the tooth and the planar end of the coupling member which first axially contacts the second coupling member upon axial engagement. This tooth configuration allows a maximum thickness of the tooth, for strength, at the root, while being designed for easy blind engagement.

The complementary second coupling member of the axially engageable rotatable coupling comprises second rigid socket portion formed of polyacetal plastic which has a generally cylindrical inner peripheral wall located coaxially with the longitudinal axis of the second coupling member and within which the first coupling member is adapted to nest for the interengagement of the first and second coupling members. A plurality of equally spaced teeth project inwardly from the inner wall of the socket portion for coaction with the teeth of the first coupling member when the complementary coupling members are axially interengaged. Each of the teeth of the second coupling member is also defined by first, second and third planar faces designed to function as working, trailing and indexing surfaces, respectively. The first and second faces intersect in a line, forming the apex of the tooth, parallel to the longitudinal axis of the second coupling member.

The second face of the tooth is radial with respect to the longitudinal axis of the second coupling member. The working surface of the teeth of the first and second coupling members are designed so as to be in contact over a substantial area of each when the coupling members are coaxially alined.

The third face, or sloping surface, cuts off the outer end of each of the teeth of the second coupling member, intersecting the tooth at the apex of a tooth between the ends of the second coupling member, and at the intersection of the trailing surface with the open end of the socket member.

DESCRIPTION OF THE PREFERRED EMBODIMENT

Figure 1:
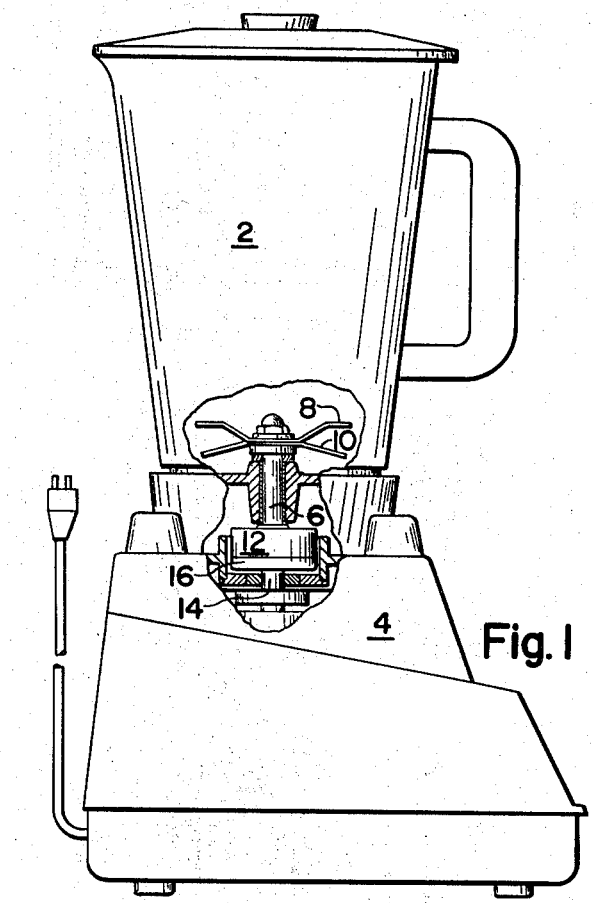
FIG. 1 is a side elevational view of a representative blender with parts broken away to show the positioning of the complementary coupling members of the present invention.

FIG. 1 shows a representative household blender including a container 2 separably mounted on a power unit 4. In a conventional manner, container 2 has a cutter mounting shaft 6 rotatably journalled through the bottom thereof and mounting cutters 8 and 10 within the container. The lower end of the cutter mounting shaft 6 has a coupling member 12 attached thereto. Container 2, along with shaft 6, and coupling member 12, may be freely lifted off the power unit 4 which includes a motor driving shaft 14 to which a complementary coupling member 16 is attached. When container 2 is on the power unit 4, as shown in FIG. 1, actuation of the power unit 4 rotates the driving shaft 14 to rotatably drive cutter mounting shaft 6 through a coupling comprising a nesting pair of coupling members, male member 12 and female member 16.

Figure 4:
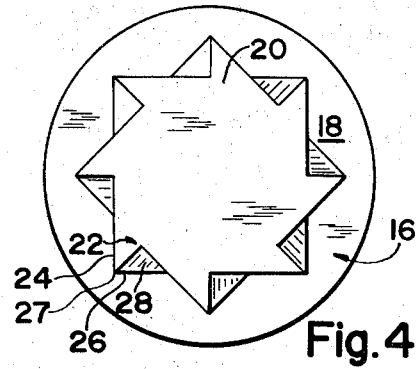
FIG. 4 is a top plan view of the flexible coupling member of the present invention.
Figure 5:
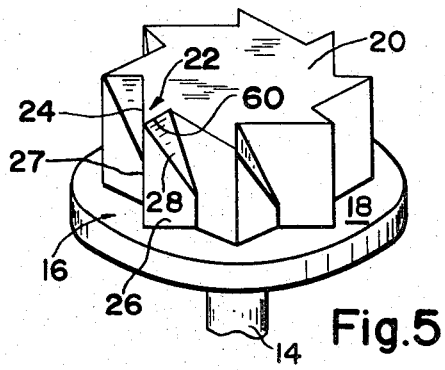
FIG. 5 is a perspective view of the flexible coupling member shown in FIG. 4.
Figure 6:
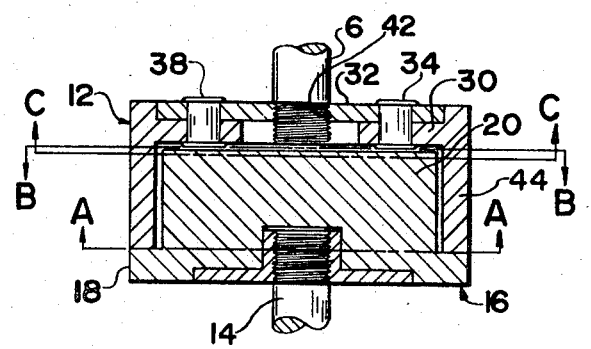
FIG. 6 is an elevational view, in section, showing the complementary coupling members of FIGS. 2-5 in assembled relationship.

As shown in FIG. 4, 5 and 6, flexible coupling member 16 has a flat circular base portion 18 and a cylindrical body portion 20 upstanding therefrom and terminating at its outer end in a generally planar surface normal to the longitudinal axis of the coupling member 13. The cylindrical body portion 20 is located coaxially on the coupling member 16. The cylindrical body portion 20 is provided with a plurality of equally spaced teeth outwardly projecting. For purposes of this discussion only one tooth, generally designated by the numeral 22, will be described, the description being applicable to each of the teeth of the coupling member 16.

The representative tooth 22 is defined by a first planar face 24, a second face 26, and a third sloping face 28; the working, trailing and indexing surfaces, respectively, of the tooth of The faces 24 and 26 intersect in a line 27, forming the apex of the tooth 22, which extends substantially parallel to the longitudinal axis of coupling member 16. Preferably, the trailing surface is planar, as well as the working surface. In the embodiment shown eight teeth are formed, each tooth having an included apex angle of 90°; an imaginary radial plane extending through the apex 27 of the tooth 22 bisects the included acute angle formed between the first and second planar faces 24 and 26. Tooth 22 extends laterally in a direction parallel to the longitudinal axis of the coupling member 16 from a first lateral end, which first coacts with coupling member 12, as the blender jar 2 is set upon the base 4; to a second lateral end, which coacts with the coupling member 12 only when the coupling is fully engaged with the blender jar 2 setting firmly on the base 4. The second lateral end of the tooth 22 is coincident with the flat circular base portion 18 of the coupling member 16.

The indexing surface 28 cuts off a portion of the trailing surface 26, passing through the intersection of the trailing surface 26 and the cylindrical body portion 20 of the coupling member 16, between the lateral ends of the tooth 22; and the intersection of the apex 27 of the tooth 22 with a plane defining the outer end of the coupling member 16, at the first lateral end of the tooth. The indexing surface 28 may be planar or a continuous curve, however, in the preferred embodiment, as shown in FIG. 5, the indexing surface 28 is planar and forms an included angle at 63° with the planar surface defining the outer end of the cylindrical body portion 20, the line of intersection being radial with respect to the longitudinal axis of the coupling member 16. Regardless of the exact shape of the indexing surface 28 or the orientation thereof, the indexing surface 28 preferably will not extend longitudinally of the coupling member more than half way between the lateral ends of the teeth 22. The purpose of the sloping indexing surface will become evident in the later discussion of the operation of the coupling.

Figure 2:
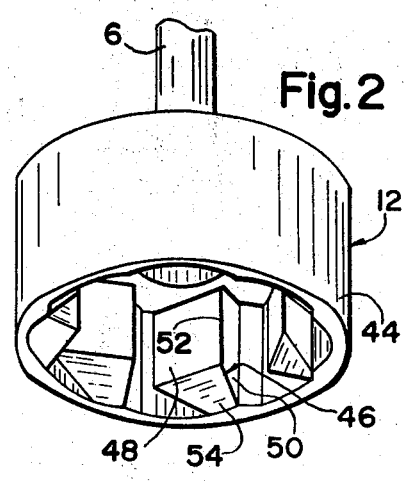
FIG. 2 is a perspective elevational view of a rigid coupling member which mates with the flexible coupling member of the present invention.
Figure 3:
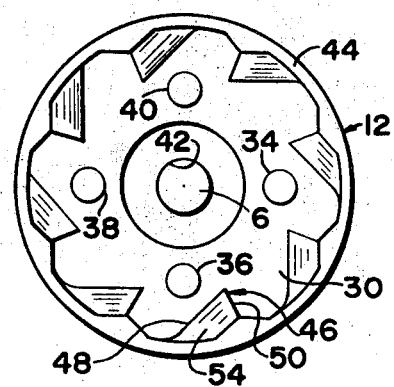
FIG. 3 is a bottom plan view of the rigid coupling member shown in FIG. 2.

Turning now to FIGS. 2, 3 and 6, coupling member 12 comprises a socket which is made of a rigid material, preferably polyacetal plastic. Coupling member 12 has a flat circular base portion 30 which includes front and back surfaces. Securely riveted to the back surface of the base portion 30, by means of eyelets, 34, 36, 38 and 40, is a flat metal plate 32. The metal plate 32 is centrally bored and tapped to define a circular threaded opening 42 into which, during assembly, is screwed the threaded end of shaft 6, as shown in FIG. 6. Depending from the periphery of the base portion 30 is a cylindrical wall portion 44 coaxially located with respect to the threaded opening 42, and the longitudinal axis of the coupling member 12. Extending inward from the inner surface of wall portion 44 are a plurality of equally spaced teeth as show in FIGS. 2 and 3. For purpose of this discussion only one tooth, generally designated by the numeral 46, will be described, this description being applicable to each of the teeth of the coupling member 12.

Tooth 46 extends laterally in a direction parallel to the longitudinal axis of the coupling member 12 from a first end at the open end of the wall portion 44, which first coacts with the coupling member 16 as the blender jar 2 is set upon the base 4, to the second end, coincident with the front surface of base portion 30 of the coupling member 12, which coacts with the coupling member 16 only when the coupling is fully engaged with the blender 2 setting firmly on the base. Tooth 46 is defined by a first planar face 48, a second face 50, and a third sloping face 54, the working, trailing, and indexing surfaces, respectively of the tooth 46. The faces 48 and 50 intersect in a line 52, forming the apex of the tooth 46, which extends substantially parallel to the longitudinal axis of the coupling member 12. The working surface 48 of the tooth 46 is oriented so as to lay flat against the moving surface 24 of tooth 22 when the coupling members are fully engaged and alined.

An imaginary radial plane extending through the apex of the tooth 46 forms an included angle between the radial plane and the first planar face or working surface 48 which is greater than the included angle between the first planar face or working surface 24 and the radial plane extending through the axis of the tooth 24 of the complementary coupling member 16. The included angle between the last-mentioned imaginary radial plane and the second face or trailing surface 50 is less than the included angle between the first planar face or working surface 48 and the same imaginary radial plane. In the preferred embodiment shown in FIG. 3, the included angle between the second face or trailing surface 50 is 0°, the trailing surface being coincident with the radial plane. The indexing surface 54 of the tooth 46 intersects the working surface 48 of the tooth 46 in a line generally parallel to the open end of the wall portion. The indexing surface 54 intersects the trailing surface 50 of the tooth 46 in a line extending from the intersection of the trailing surface 50 with the inner surface of the wall 44 at the open end of the wall portion 44, to the apex 52 of the tooth 46 between the lateral ends of the tooth 46. In the preferred embodiment, as shown in FIG. 2, the trailing and indexing surfaces 50 and 54, respectively, are both planar and the trailing surface 50 extends less than half way between the radial ends of the tooth 46. The included angle between the sloping surface 54 and a plane defining the outer end of the wall portion 44 is preferably approximately 45°.

Figure 7:
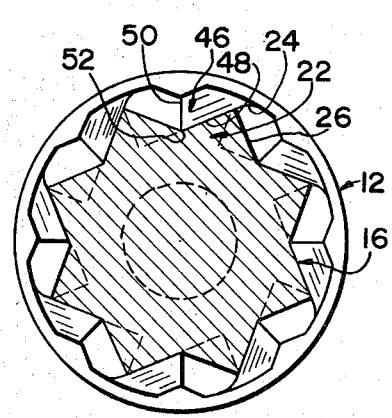
FIG. 7 is a view taken on line A-A of FIG. 6 showing the coupling members of the present invention in the fully engaged driving relationship.

FIG. 7 shows coupling members 12 and 14 interengaged. It will be noted that the coupling drive is through the coaction of the mating working tooth surfaces 48 of teeth 46 and 24 of teeth 22, respectively. If there is radial misalinement of the two coupling members 12 and 16 the normal force between driving surfaces has a component parallel to the working or driving surfaces 48 and 24 which enhances self-alinement tending to cause these surfaces to slip past one another to coaxial, alined position. It can be seen in this FIG. that the shape of the teeth 46 provide space between the trailing tooth surfaces at all times.

Figure 8:
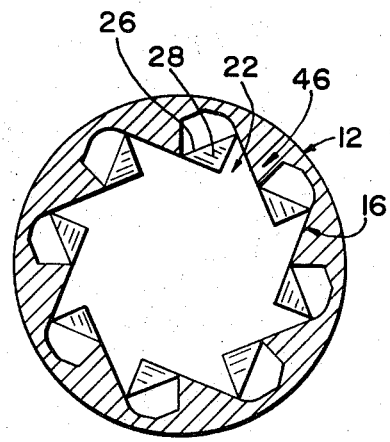
FIG. 8 is a view taken on line B-B of FIG. 6, showing the coupling member of the present invention in the fully engaged driving relationship.

As clearly shown in FIG. 8, the spaces between the first lateral ends of the teeth 22 and 46, at first contact, are maximized as a result of the sloping faces 28 of the teeth 22 of the coupling member 16, enabling coupling member 12 to engage with coupling member 16 with a minimum of interference. There is only a small arc through which the teeth will contact one another at first contact. The alining and self-indexing feature of the coupling are nearly as good as if the trailing surfaces 26 of the teeth 22 of the coupling member 16 were defined by radial planes along the entire lateral length of the teeth 22, while the heavier tooth roots over most of the lateral length of each tooth 22 allows the coupling to carry heavier loads before the teeth 22 will flex so greatly that slippage occurs. When and if slippage does occur, particularly when jamming a container down on a power unit which has been already turned on, the coupling is permanently disabled. The friction of the rubber teeth 22 slipping over the plastic teeth 46 causes enough heat to melt the plastic teeth 48.

Figure 9:
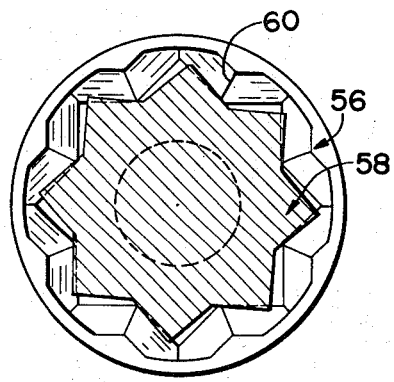
FIG. 9 shows a modified pair of complementary coupling members at initial engagement. The female coupling member is illustrated in an end view taken through line A-A of FIG. 6, while the male coupling member is illustrated in a sectional view taken through line C-C of FIG. 6.
Figure 10:
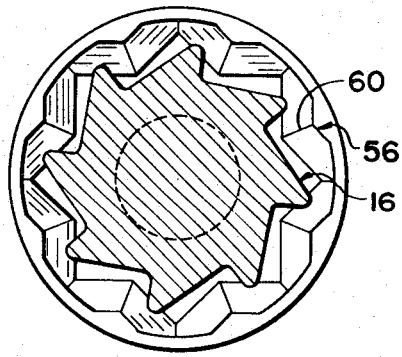
FIG. 10 shows a second modified pair of complementary male and female coupling members at initial engagement, viewed through lines C-C and A-A, respectively, of FIG. 6.

In order to show the advantages of the shape of applicant's teeth there are shown, in FIGS. 9 and 10, couplings with more conventionally shaped teeth. FIG. 9 shows a coupling having coupling members 56 and 58 which are the same as the previously discussed coupling members 12 and 16, respectively, except that the teeth of both coupling members 56 and 58 are symmetrical. It will be seen that rotation of coupling member 58 slightly in either direction causes interference between the teeth of coupling members 56 and 58 which hinders self-indexing in nearly all positions. The sharp dividing line 60 of the symmetrical teeth on coupling member 56 nearly always strikes the teeth on coupling member 58 when the coupling members are being mated.

Figure 11:
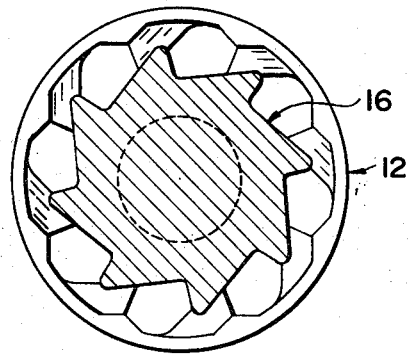
FIG. 11 shows the pair of complementary male and female coupling members of the present invention at initial engagement, viewed through lines C-C and A-A, respectively of FIG. 6.

FIG. 10 shows coupling member 16 of FIGS. 4 and 5 mated with coupling 56. The section of the coupling 16 is taken across line C-C of FIG. 6, illustrating that the right triangular shape of the teeth 22 at the first lateral ends thereof eliminate half the interference between dividing line 60 and the teeth on coupling 16 so that in the position shown only the tips of the teeth on coupling 16 interfere with sloping surfaces on the teeth of coupling 56. FIG. 11 shows couplings 12 and 16 and indicates how even the interference described with regard to FIG. 10 is eliminated. Again, the section of the coupling 16 is taken across line C-C of FIG. 6. There is interference only over a small arc as compared to interference in any position with the arrangements of FIGS. 9 and 10.

Coupling member 16 is preferably made of neoprene and can also be made of natural rubber or other rubberlike elastomeric material. The material used for coupling member 16 preferably has a durometer hardness between 75 and 90 with the preference being closer to the upper limit than the lower. If the material is too soft the teeth will not have sufficient rigidity to drive under load and will flex excessively thereby causing the coupling to slip. If the material is too hard the sound dampening properties are not good and there is greater danger of fracture under impact loads due to brittleness. With material of around 85 durometer hardness there is good sound dampening and sufficient flexibility to absorb impact flexibility without fracturing. The coefficient of static and dynamic friction for relatively soft neoprene is very high and this makes self-indexing difficult when a neoprene coupling member is used. It also inhibits self-alining because it is difficult for the surfaces of the coupling members to slide past one another. For neoprene of approximately 75 durometer hardness, sliding on smooth rigid polyacetal plastic with a 1.8 pound normal force, the coefficient of static friction has been found to be around 1.61 and the kinetic coefficient around 1.33. With an 11.8 pound normal force, the static coefficient is around 4.14 and the kinetic around 2.55.

In order to facilitate self-indexing and self-alining, it is necessary to considerably lower these coefficients of friction. It has been found that this can be done by soaking the neoprene coupling member in a bromine solution to form a rubber hydrobromide on the surface which is much harder and smoother than an untreated surface. The solution used is preferably 2½—4 percent bromine in water and the coupling is soaked for 5—7 minutes. This glazes the surface of the coupling member. A chlorine solution could also be used and the surface of the coupling may be said to be halogenated. After soaking in bromine solution, the coupling member is rinsed with 10 percent ammonia solution to neutralize the free bromine by forming ammonium bromide and then rinsed with clear water to remove all traces of ammonium bromide. After this treatment it has been found that the surface friction is dramatically reduced. For neoprene of approximately 75 durometer hardness, the coefficient of static friction, after treatment on smooth rigid polyacetal plastic, under a 1.8 pound normal force, is around 0.48, and the kinetic coefficient around 0.32. Under an 11.8 pound normal force the static coefficient is around 0.50, and the kinetic around 0.38. The surface of the treated coupling has a static coefficient of friction which is less than one third the coefficient for an untreated coupling. The dynamic coefficient shows even more dramatic reduction especially under high normal forces. Thus, the coupling member 15 is relatively soft and retains good sound dampening properties and capability to absorb impact without fracturing while also providing easy self-indexing due to the glazed surface having lower coefficients of friction.

I claim:

1. A first rotatable coupling member comprising:
   a. a generally cylindrical body portion located coaxially with the longitudinal axis of said first rotatable coupling member, said body portion having first and second generally planar axial ends designated respectively by the sequence of engagement with a second rotatable coupling member as said first and second coupling members are axially interengaged;
   b. a plurality of equally spaced teeth formed integrally with said body portion of said first coupling member and projecting outwardly therefrom;
   c. each of said teeth being defined by first, second and third faces designed to function as forward, trailing and indexing surfaces, respectively, each pair of said first and second faces intersecting in a line forming the apex of a respective tooth;
   d. said line forming the apex of each of said respective teeth being parallel to said longitudinal axis of said first coupling member;
   e. said first face of each of said teeth being planar and extending substantially parallel to the longitudinal axis of said body portion;
   f. said first and second faces of each of said teeth intersecting at an acute included angle;
   g. each of said teeth being shaped so that an imaginary radial plane passing through the apex of a tooth bisects said included angle between the respective first and second faces; and
   h. said third face of each of said teeth defining the ends of the teeth at the first end of said first coupling member, said third face cutting off a portion of said second face and passing through the apex of said respective tooth at said planar first end of said coupling member.

2. The rotatable coupling of claim 1 wherein said second face of each of said teeth is planar.

3. The rotatable coupling of claim 1 wherein said third face of each of said teeth is planar.

4. The rotatable coupling of claim 3 wherein said third face forms an included angle of approximately 63° with the planar first end of said coupling member.

5. The rotatable coupling of claim 3 wherein each of said third faces intersects said generally planar first end of said first coupling member in a line radial with respect to said longitudinal axis of said first coupling member.

6. The rotatable coupling member of claim 1 wherein said coupling member is formed of an elastomeric material.

7. The rotatable coupling member of claim 6 wherein the surface of said elastomeric material is halogenated to provide a slick, hard surface.

8. A rotatable coupling having axially engageable first and second coupling members including the first coupling member of claim 1, said second coupling member comprising:
   a. a socket portion having a generally cylindrical inner peripheral wall, located coaxially with said longitudinal axis of said second coupling member, and within which the first coupling member is adapted to nest for the interengagement of said first and second coupling members, said socket portion having first and second axial ends designated respectively by the sequence of engagement with said first coupling member as said first and second coupling members are axially fully interengaged;
   b. a plurality of equally spaced teeth projecting inwardly from the inner peripheral wall of said socket portion for coaction with said teeth of said first coupling member when said first and second coupling members are interengaged;
   c. each of said teeth of said second coupling member being defined by first, second and third faces, said first and second faces designed to function as working, trailing and indexing surfaces, respectively, intersecting in a line forming the apex of a respective tooth;
   d. said line forming the apex of each of said teeth being parallel to said longitudinal axis of said second coupling member;
   e. said first face of each of said teeth being planar and extending substantially parallel to the longitudinal axis of said second coupling member;
   f. said first and second faces of each of said teeth of said second coupling member intersecting each other at an acute included angle;
   g. an included angle formed between an imaginary radial plane extending through said apex of each of said teeth of said second coupling and said first planar face of a respective tooth being greater than the included angle between an imaginary radial plane extending through said apex of a tooth of said first coupling and said first plane face of the respective tooth of said first coupling;
   h. said imaginary radial plane extending through the apex of a tooth of said second coupling member forming an included angle with said second face less than the angle formed by said imaginary radial plane and said first face of a tooth of said second coupling member; and
   i. said third face of each of said teeth, of said second coupling member, is located on the end of said tooth adjacent said first end of said socket portion, said third face being a continuous sloping surface, said sloping surface passing through the intersection of said second face with said generally cylindrical inner wall at said first end of said socket portion and through the axis of said tooth between said first and second ends of said socket portion.

9. A rotatable coupling as recited in claim 8 wherein said second face of each of said teeth of said second coupling member is planar and extends radially with respect to the longitudinal axis of said second coupling member.

10. A rotatable coupling as recited in claim 8 wherein said third face of each of said teeth of said second coupling member is planar.

11. A rotatable coupling as recited in claim 10 wherein said planar third face of each of said teeth at said second coupling member forms an included angle of approximately 45° with the first end of said socket member, said first end of said socket member being defined by a plane normal to said longitudinal axis of said second coupling member coincident with the open end of said socket member.

12. A rotatable coupling as recited in claim 8 wherein said first coupling member is formed of an elastomeric material and said second coupling member is formed of a rigid material.

13. A rotatable coupling as recited in claim 12 wherein the surface of said elastomeric material is halogenated to provide a slick, hard surface.

UNITED STATES PATENT OFFICE
CERTIFICATE OF CORRECTION

Patent No. 3,542,178          Dated    November 24, 1970

Inventor(s)    Melvin H. Ripple

It is certified that error appears in the above-identified patent and that said Letters Patent are hereby corrected as shown below:

Column 1, line 6, "self-aline" should read -- self-align line 30, "alined" should read -- formed --; line 34, "aline" should read -- aligned --; line 66, "self-alinement" should r -- self-alignment --. Column 2, line 8, after "impact" insert -- loads --; line 10, after "first" cancel "is"; line 35, after "comprises" cancel "second" and insert -- a --. Column line 10, before, "modified" insert -- first --; line 44, canc "13"; Column 4, line 51, "alined" should read -- aligned --. Column 5, line 6, "misalinement" should read -- misalignment line 9, "self-alinement" should read -- self-alignment --; li 11, "alining" should read -- aligned --; line 20, "alining" should read -- aligning --. line 75, "self-alining" should read -- self-aligning --. Column 6, line 8, "self-alining" should read -- self-aligning --.

Signed and sealed this 1st day of June 1971.

(SEAL)
Attest:

EDWARD M. FLETCHER, JR.
Attesting Officer

WILLIAM E. SCHUYLER,
Commissioner of Patent